United States Patent [19]

Isaksson et al.

[11] 3,993,433

[45] Nov. 23, 1976

[54] CYLINDRICAL ELONGATED FURNACE FOR TREATING MATERIAL AT HIGH TEMPERATURE IN A GASEOUS ATMOSPHERE UNDER HIGH PRESSURE

[75] Inventors: Sven-Erik Isaksson, Robertsfors; Bo Christer Jakobsson, Vasteras, both of Sweden

[73] Assignee: Allmanna Svenska Elektriska Aktiebolaget, Vasteras, Sweden

[22] Filed: Aug. 21, 1975

[21] Appl. No.: 606,592

[30] Foreign Application Priority Data

May 27, 1975  Sweden .............................. 7506009

[52] U.S. Cl. .............................. 432/247; 266/249; 432/205; 432/249
[51] Int. Cl.² ...................... F27D 1/00; F27B 5/04
[58] Field of Search ................... 432/205, 247, 249; 266/5 E, 249

[56] References Cited

UNITED STATES PATENTS

| | | | |
|---|---|---|---|
| 3,790,339 | 2/1974 | Larker et al. | 432/249 |
| 3,790,340 | 2/1974 | Isaksson et al. | 432/249 |
| 3,900,189 | 8/1975 | Elmgren et al. | 266/5 E |

Primary Examiner—John J. Camby
Attorney, Agent, or Firm—Watson, Cole, Grindle & Watson

[57] ABSTRACT

In a cylindrical elongated furnace for treating materials at high temperature in a gaseous atmosphere under high pressure, there is a vertical cylindrical pressure chamber forming a furnace space surrounded by a cylindrical heater, with an insulating sheath around the furnace space and the heater formed of a number of metal tubes with insulation between them. At least one of the metal tubes is suspended from a supporting member at the upper part of the insulating sheath and is provided at its lower part with a number of slots extending upwardly from the bottom edge.

7 Claims, 3 Drawing Figures

CYLINDRICAL ELONGATED FURNACE FOR TREATING MATERIAL AT HIGH TEMPERATURE IN A GASEOUS ATMOSPHERE UNDER HIGH PRESSURE

BACKGROUND OF THE INVENTION

1. Field of the Invention

The present invention relates to a cylindrical elongated vertical furnace for treatment of material at high temperature, preferably above 1000° C in a gaseous atmosphere under high pressure, preferably above 500 bar.

2. The Prior Art

Pressure furnaces involve many constructional problems compared with furnaces operating at atmospheric pressure or lower pressure. The furnace space must be enclosed in a pressure chamber capable of confining gas under high pressure. This means that the cost of the furnace per unit of volume will be high. The cost increases rapidly with increased pressure and increased pressure chamber diameter. This means that it is necessary to economize the space in the pressure chamber. The heating of the pressure chamber walls must be limited in order to be able to obtain and maintain the desired treatment temperature with a reasonable supply of energy. The insulation and the heater inside the pressure chamber between the furnace space and the pressure chamber walls must be designed with the smallest radial extension in order to obtain a maximum furnace space. Designing the furnaces so that a furnace space with a large diameter is obtained in a pressure chamber with a small diameter involves many difficult problems. In the U.S. Pat. Nos. 3,598,378, 3,628,779 and 3,790,339 pressure furnaces of various designs are described in greater detail. In all these furnaces there is an insulating sheath between the heater and the pressure chamber wall, said sheath containing a number of metal tubes and an insulation applied between these tubes. Insulating sheaths in which at least the innermost or the inner metal tubes are freely suspended in a supporting member have been found to possess particularly good insulating properties. However, also these have proved to have a shorter life than desirable. The lower parts of the inner tube or tubes have buckled during the operation of the furnace. In all essentials this buckling has restricted itself to the parts of the tubes which are strongly cooled by the in-flowing pressure medium when the furnace is filled. The buckling has shown a tendency to increase continuously, which means that the inner tube sooner or later will come into contact with the heater or heating elements supported by the heater, or the leads of said heating elements. This will result in short-circuits or other damage to the heater so that it must be replaced. The buckling makes it difficult or impossible to withdraw the heater without its being totally destroyed. The buckling also means that the inner tube of the insulating casing has to be exchanged.

SUMMARY OF THE INVENTION

According to the invention, at least the innermost metal tube in the insulating sheath at its lower part is provided with a number of slots, which are preferably axially oriented. The length of the slots is usually between 100 and 500 mm. The slot length should be greater for a high furnace than for a low. The distance between the slots should be between 30 and 100 mm. Around the slotted part there is/are suitably supplied one or more supporting rings to which the parts between the slots are attached. The result of the slotting up is astonishing. Tests show that the service life increases at least five times. The previous operational disturbances caused by buckling of the insulating sheath are substantially eliminated.

BRIEF DESCRIPTION OF THE DRAWINGS

The invention is described in greater detail with reference to the accompanying drawings.

DESCRIPTION OF THE PREFERRED EMBODIMENTS

Figure 1:
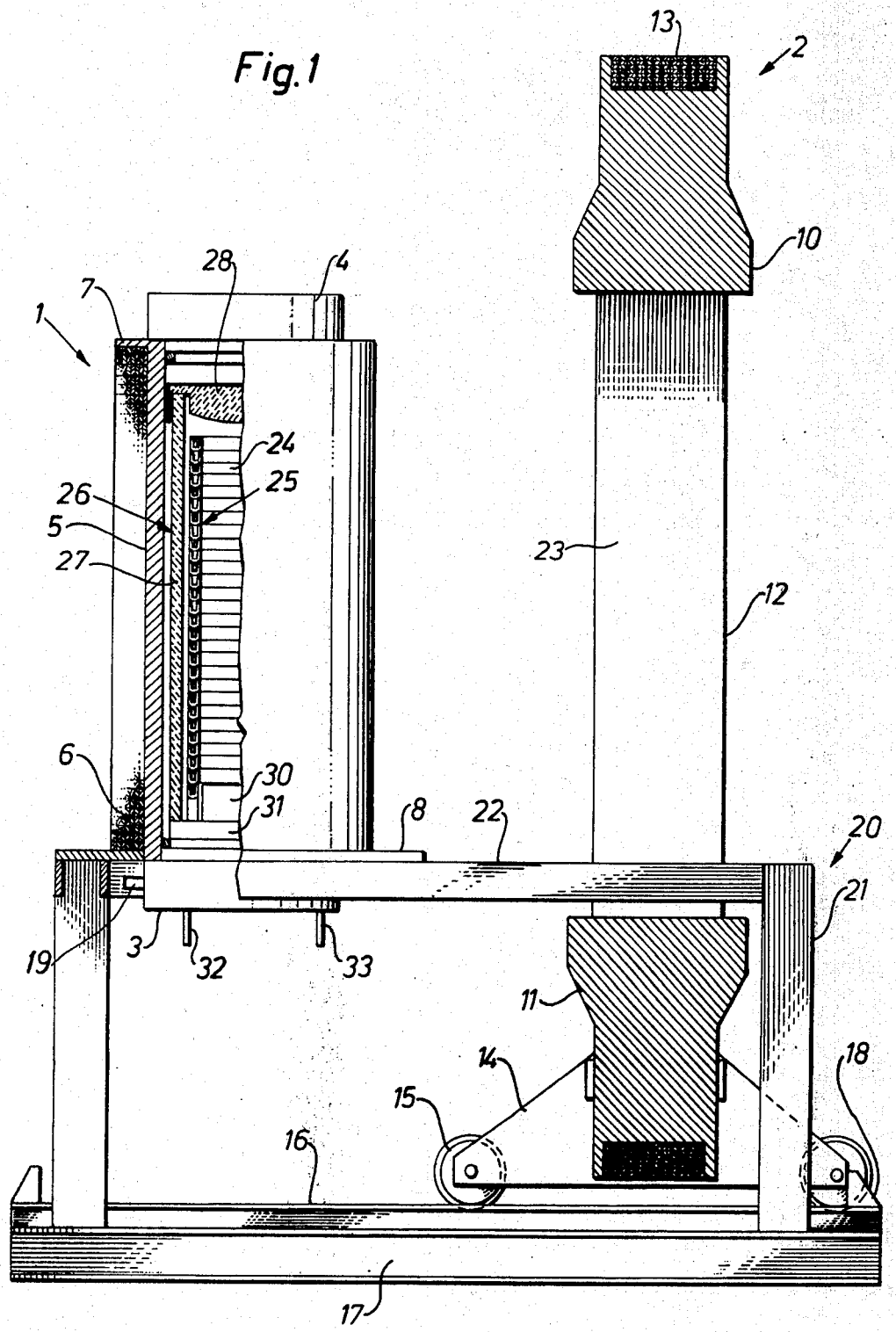
FIG. 1 shows a pressure furnace, partly in cross-section.

FIG. 1 shows a pressure furnace of the type which comprises a stationary pressure chamber 1 and a movable press stand 2 intended to take up forces operating on the end closures 3 and 4 of the pressure chamber. The pressure chamber is constructed with a high pressure cylinder which consists of a tube 5 surrounded by a force-absorbing strip sheath 6 and an upper end plate 7 and a lower end plate 8 intended to support the pressure chamber 1. The press stand 2 is built up of an upper yoke 10 and a lower yoke 11, intended to take up forces operating on the end closures 3 and 4, two spacers 12 and a surrounding strip sheath 13 holding it together. The press stand is supported by a frame 14 with rail wheels 15 running on rails 16 on a bottom plate 17. The movement is limited by an end stop 18. On the bottom plate there is a trestle-like supporting frame 20 consisting of four pillars 21 and two supporting beams 22 passing through the window opening 23 of the press stand. The lower end plate 8 of the pressure chamber rests on these beams 22. In the pressure chamber 1 there are a furnace space 24, a heater 25, an insulating casing 26 consisting of an insulating sheath 27 with a removable lid 28 and an insulating bottom 30. The heater 25 and the casing 26 are supported by a bottom plate 31. Between the end closures 3 and 4 and the tube 5 there are seals. Energy is supplied to the heater through the conductor 32. Measurement values from thermocouples are obtained through the conductor 33.

Figure 2:
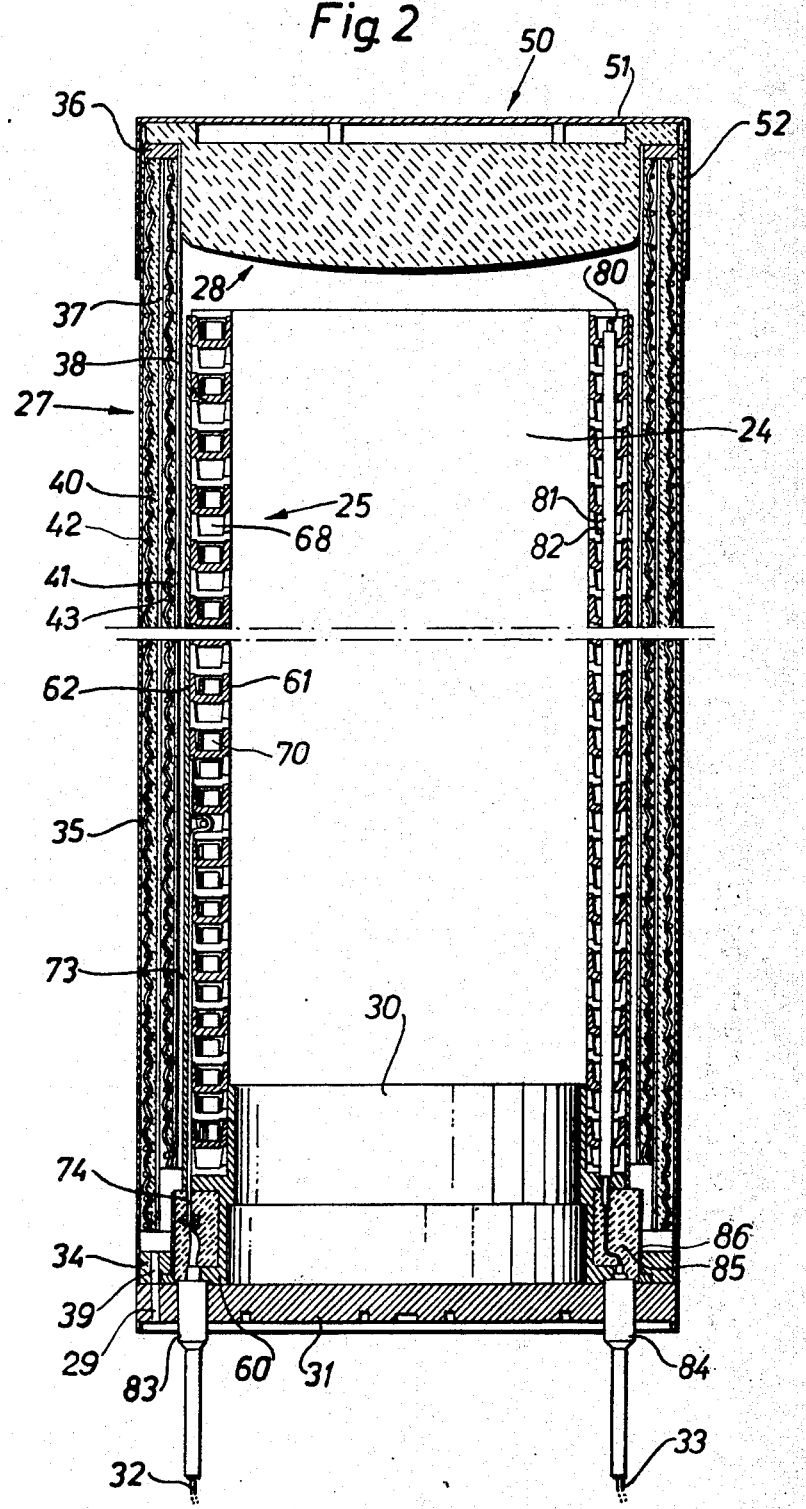
FIG. 2 on a larger scale a vertical section through a furnace insulation and a heater, FIG. 3 on a still larger scale a section of the lower portion of the insulation casing and a part of its interior.
Figure 3:
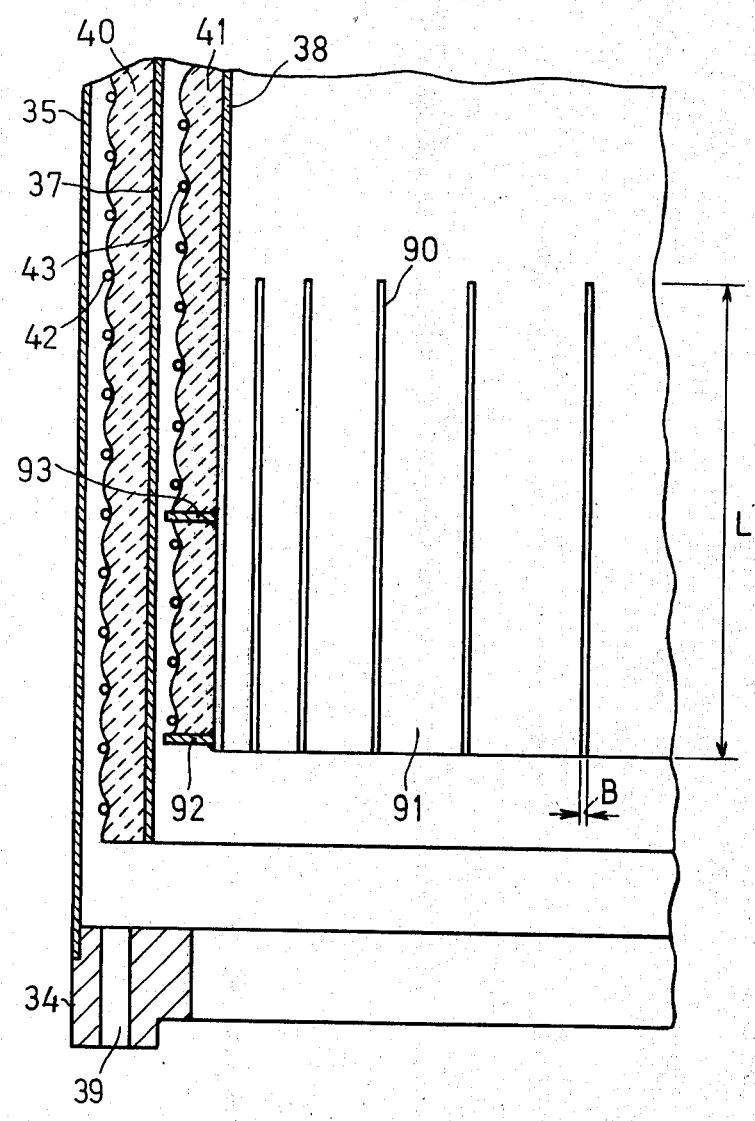

The insulating sheath is described in more detail with reference to FIGS. 2 and 3.

The insulating sheath 27 consists of a lower metal ring 34, an outer tube 35, an upper metal ring 36, suspended tubes 37 and 38, a felt-like ceramic insulation 40 and 41 wound on the tubes 37 and 38 and strips 42 and 43 keeping the insulation pressed against the tubes. The number of tubes and insulating layers is determined by the working temperature and working pressure of the furnace. The lid 28 consists of two plates with insulating material placed between them. The lid is provided with a flange projecting down into a slot in the ring 36 which may contain sealing material intended to prevent a gas flow between the lid and the ring 36 of the insulating sheath 27. Above the lid 28 there is applied a second lid 50 which consists of a plane plate 51 and a flange 52 extending down from said plate. In the lower end closure there is a connection 19 for the supply of pressure medium and a through channel (not shown). This channel opens out below the channel 29 and 39 in the bottom plate 31 and the ring 34, respectively.

The heater 25 includes a supporting ring 60 on which there rests a cylinder which is built up of a large number of U-shaped ceramic bodies 61 and a support insulation 62 and strips 63 holding these parts together. The ceramic bodies form annular channels 68 for heating elements 70. These consist of folded strips, standing on end, of materials known per se which are suitable for the working temperature chosen. Between the heater 25 and the insulating sheath 27 there is a gap 73. The heating elements can be placed more tightly at the lower part of the furnace than at the upper part because the heat requirement is greatest at the lower part of the furnace space because of convection within the furnace space. As shown in FIG. 2, heating elements 70 are arranged in each channel 68 at the lower part of the heater 25, but only in every second channel at its upper part. Leads 74 for feeding the heating elements 70 consist of flat strips which are arranged in slots in the outer flanges of the ceramic elements 61. The leads are thus placed entirely inside the support insulation 62.

Thermocouples 80 are arranged in ceramic tubes 81 passing through holes 82 in the webs of some of the U-shaped ceramic bodies.

The leads 74 and the thermocouples 80 are connected to lead-in wires 83 and 84 and these, in turn, are connected to the conductors 32 and 33. The annular space 85, which is formed between the ring 60 and a ring 86 and where the leads 74 and the thermocouples 80 are joined to the connections 83 and 84, is filled with an insulating material.

The inner tube 38 of the insulating sheath is provided at the bottom with a number of vertically running slots 90 extending upwardly from the bottom edge between which strips 91 are formed. Around the slotted portion there are applied two supporting rings 92 and 93 which are joined to the strips 91 by welding at the middle portion of the strips. As an example it may be mentioned that an insulating sheath 27 with an inner tube 38 with a diameter of 660 mm is provided with 36 slots having a width B = 3 mm and a length L = 200 mm.

We claim:

1. Cylindrical elongated furnace for treating materials at high temperature in a gaseous atmosphere under high pressure, comprising a vertical cylindrical pressure chamber capable of confining a gas under high pressure, a furnace space, a cylindrical heater around the furnace space, an insulating sheath surrounding the furnace space and the heater, which is formed of a number of metal tubes and insulation applied between the tubes, and an insulating lid and an insulating bottom at the ends of the insulating sheath, the insulating sheath comprising a metal tube suspended from a supporting member at the upper part of the insulating sheath and provided at its lower part with a number of slots running substantially vertically.

2. Furnace according to claim 1, in which the innermost tube of the insulating sheath is provided with slots.

3. Furnace according to claim 1, in which at least two suspended tubes are formed with slots.

4. Furnace according to claim 1, in which the outer tube of the insulating sheath supports said supporting member and metal tubes suspended therein.

5. Furnace according to claim 1, in which the slots are axially oriented.

6. Furnace according to claim 5, in which the length of the slots is 100–500 mm and the distance between the slots is 30–100 mm.

7. Furnace according to claim 5, in which the tube portion with slots is provided with a supporting ring.

* * * * *